United States Patent
Pan et al.

(10) Patent No.: US 11,830,975 B2
(45) Date of Patent: Nov. 28, 2023

(54) CROSS-LINKED ORGANIC-INORGANIC SOLID COMPOSITE ELECTROLYTE FOR LITHIUM SECONDARY BATTERIES

(71) Applicant: Nano and Advanced Materials Institute Limited, Hong Kong (HK)

(72) Inventors: Hui Pan, Hong Kong (HK); Jianping Han, Hong Kong (HK); Yong Zhu, Hong Kong (HK); Heng Liu, Hong Kong (HK); Ou Dong, Hong Kong (HK); Shengbo Lu, Hong Kong (HK); Chenmin Liu, Hong Kong (HK)

(73) Assignee: Nano and Advanced Materials Institute Limited, Hong Kong (HK)

( * ) Notice: Subject to any disclaimer, the term of this patent is extended or adjusted under 35 U.S.C. 154(b) by 312 days.

(21) Appl. No.: 17/128,170

(22) Filed: Dec. 20, 2020

(65) Prior Publication Data

US 2021/0218050 A1    Jul. 15, 2021

Related U.S. Application Data

(60) Provisional application No. 62/960,722, filed on Jan. 14, 2020.

(51) Int. Cl.
*H01M 10/056* (2010.01)
*H01M 10/0525* (2010.01)
(Continued)

(52) U.S. Cl.
CPC ........ *H01M 10/056* (2013.01); *C08G 18/246* (2013.01); *C08G 18/485* (2013.01);
(Continued)

(58) Field of Classification Search
None
See application file for complete search history.

(56) References Cited

U.S. PATENT DOCUMENTS

| 2001/0011119 A1* | 8/2001 | Naijo | H01M 4/13 |
| | | | 252/500 |
| 2005/0003276 A1* | 1/2005 | Sakai | H01M 10/052 |
| | | | 429/231.95 |

(Continued)

FOREIGN PATENT DOCUMENTS

| CN | 108878959 A | 11/2008 |
| CN | 109994770 A | 7/2019 |

OTHER PUBLICATIONS

Office Action of corresponding China Patent Application No. 202011528325.9 dated Jul. 1, 2023.

*Primary Examiner* — Nathanael T Zemui
(74) *Attorney, Agent, or Firm* — Idea Intellectual Limited; Margaret A. Burke; Sam T. Yip

(57) ABSTRACT

An amorphous composite solid electrolyte is provided that includes one or more three-dimensional branched macromolecules with a core portion and at least three arm portions connected to the core portion. Each arm portion includes a random copolymer or a block polymer comprising a first monomer and a second monomer with a molar ratio of the first monomer to the second monomer in the range from greater than 0 to less than or equal to 1. An ion conductive electrolytic solution including at least one lithium salt solution in an amount of approximately 1 mol/l to 10 mol/l is entrained within the branched macromolecule, with a weight ratio of the branched macromolecule to the ion conducive electrolytic solution equal to or lower than 1:9, such that the branched macromolecule has a swelling degree of at least 5:1 (liquid:polymer in weight) of the ion conductive electrolytic solution.

8 Claims, 9 Drawing Sheets

(51) Int. Cl.
*H01M 12/08* (2006.01)
*C08G 18/24* (2006.01)
*C08G 18/81* (2006.01)
*C08G 83/00* (2006.01)
*C08G 18/18* (2006.01)
*C08G 18/48* (2006.01)

(52) U.S. Cl.
CPC ........ *C08G 18/8116* (2013.01); *C08G 83/002* (2013.01); *H01M 10/0525* (2013.01); *H01M 12/08* (2013.01); *H01M 2300/0028* (2013.01); *H01M 2300/0068* (2013.01); *H01M 2300/0082* (2013.01); *H01M 2300/0088* (2013.01)

(56) References Cited

U.S. PATENT DOCUMENTS

2014/0363746 A1* 12/2014 He .................... H01M 10/0569
                                                                           429/188
2019/0237748 A1* 8/2019 Shin ...................... H01M 4/623

* cited by examiner

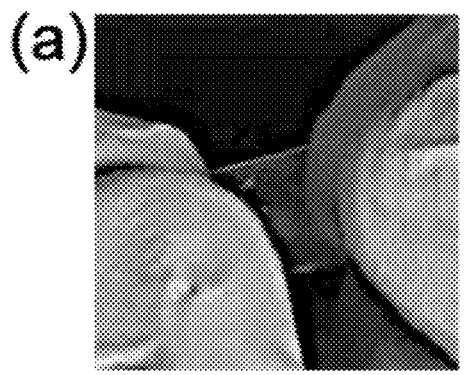
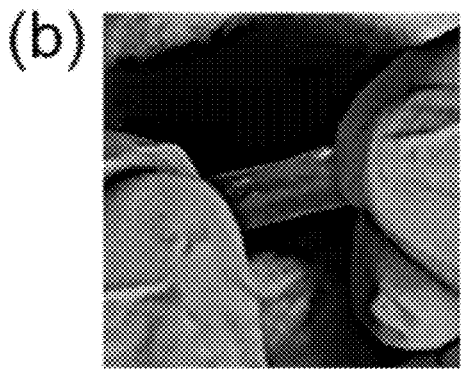
FIG. 3A    FIG. 3B
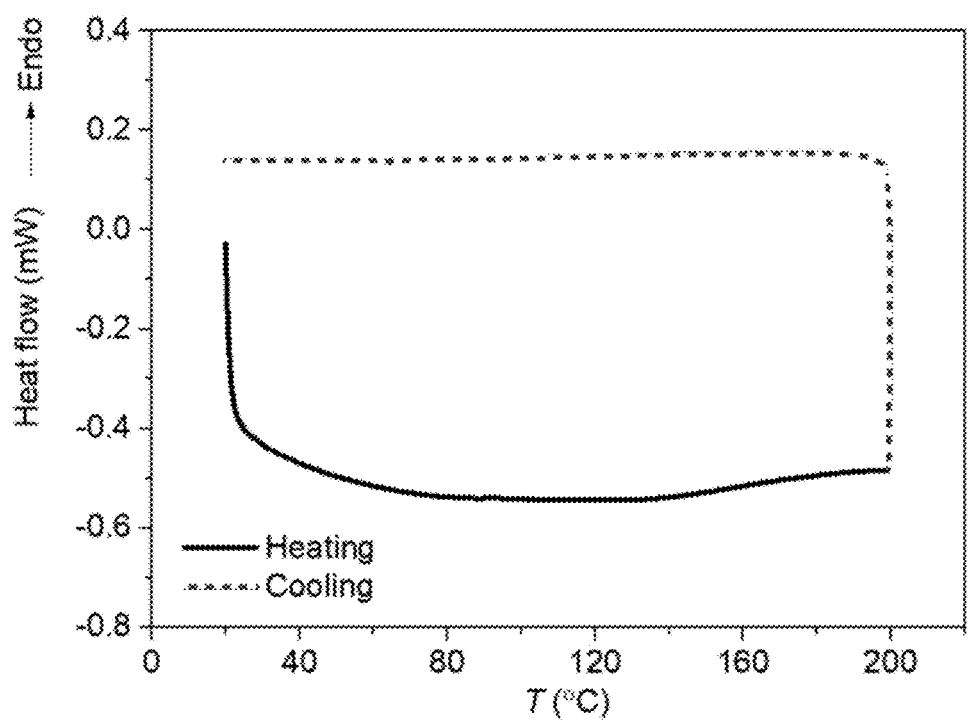
FIG. 4

CROSS-LINKED ORGANIC-INORGANIC SOLID COMPOSITE ELECTROLYTE FOR LITHIUM SECONDARY BATTERIES

CROSS-REFERENCE TO RELATED APPLICATIONS

This application claims priority from the U.S. provisional patent application Ser. No. 62/960,722 filed Jan. 14, 2020, and the disclosure of which is incorporated herein by reference in its entirety.

FIELD OF THE INVENTION

The present invention relates to a solid electrolyte in lithium-ion battery, and more particularly to a composite solid electrolyte with high ionic conductivity, good electrochemical stability and good compatibility with the cathode.

BACKGROUND

With the rapid development of portable electronic devices and electric vehicles, lithium-ion batteries have dominated in the market for last decade. However, the development of current lithium-ion batteries is encountering safety issues such as: leakage, fires, and explosion due to the low-boiling point organic electrolytes. Consequently, the dilemma of high performance versus safety of lithium batteries becomes more apparent. The pressing demand for a combination of high energy-density and high safety in lithium battery motivates the exploration of an all-solid-state lithium battery, the core issue of which is the need for a solid electrolyte. The all-solid-state lithium battery uses a solid electrolyte as the ionic conductor, substituting for the flammable liquid electrolyte, which greatly improve the safety of the battery. Due to the effective suppression of Li dendrite formation, the solid electrolyte also facilitates the utilization of a Li metal anode in the battery, significantly elevating the energy density of the battery. However, there are many challenges to overcome in order to develop a solid-state battery: in particular, prior art solid electrolytes suffer from poor compatibility with the cathode, low ionic conductivity, and issues with electrochemical stability.

Therefore, in order to meet the requirement of high ionic conductivity and electrochemical stability and well compatibility with the cathode, there is a need in the art for a new type of solid electrolyte for lithium batteries.

SUMMARY OF THE INVENTION

The present invention is not to be limited in scope by any of the following descriptions. The following examples or embodiments are presented for exemplification only.

Accordingly, a first aspect of the present invention provides an amorphous composite solid electrolyte. The amorphous composite solid electrolyte include one or more three-dimensional branched macromolecules with a core portion and at least three arm portions connected to the core portion, each arm portion including a random copolymer or a block polymer comprising a first monomer and a second monomer with a molar ratio of the first monomer to the second monomer in the range from greater than 0 to less than or equal to 1; a branched macromolecule is cross-linked to one or more additional three-dimensional branched macromolecules. An ion conductive electrolytic solution is provided, the ion conductive electrolytic solution including at least one lithium salt solution in an amount of approximately 1 mol/l to 10 mol/l. The ion conductive electrolytic solution is entrained within the branched macromolecule, with a weight ratio of the branched macromolecule to the ion conducive electrolytic solution equal to or lower than 1:9, such that the branched macromolecule has a swelling degree of at least 5:1 (liquid:polymer in weight) of the ion conductive electrolytic solution.

In a first embodiment of the first aspect of the present invention, there is provided an amorphous composite solid electrolyte where the core portion is one of polyols including ethylene glycol, glycerinum, pentaerythritol, xylitol, sorbitol and the like.

In a second embodiment of the first aspect of the present invention, there is provided an amorphous composite solid electrolyte where the first monomer is ethylene oxide and the second monomer is propylene oxide.

In a third embodiment of the first aspect of the present invention, there is provided an amorphous composite solid electrolyte where each arm portion further comprises a third monomer selected from acrylate, acrylamide, or epoxy.

In a fourth embodiment of the first aspect of the present invention, there is provided an amorphous composite solid electrolyte where the branched macromolecule has a molecular weight in the range from 1,000 to 50,000.

In a fifth embodiment of the first aspect of the present invention, there is provided an amorphous composite solid electrolyte further comprising electrolyte additives selected from fluoroethylene carbonate, dimethyl glycol, orthoformate fluoride, tris(2,2,2-trifluoroethyl)orthoformate, 1,1,1,3,3,3-Hexafluoro-2-propanol, membrane-forming agents, fire retardants, ceramic particles, or mixture of them.

In a sixth embodiment of the first aspect of the present invention, there is provided an amorphous composite solid electrolyte where the ion conductivity of the composite solid electrolyte is at least $1\times10^{-3}$ S/cm.

In a seventh embodiment of the first aspect of the present invention, there is provided an amorphous composite solid electrolyte where the oxidation potential of the branched macromolecule is at least 5V.

In an eighth embodiment of the first aspect of the present invention, there is provided an amorphous composite solid electrolyte where the energy density of a secondary lithium-ion battery composed of the composite solid electrolyte is at least 300 Wh/kg.

A second aspect of the present invention is to provide a method for fabricating an amorphous composite solid electrolyte, which includes (1) synthesizing at least one three-dimensional branched macromolecule by reaction of polyether polyol with one of 2-Isocyanatoethyl acrylate or 2-Isocyanatoethyl methacrylate, with dibutyltin dilaurate as a catalyst; (2) synthesizing at least one ion conductive electrolytic solution by mixing a lithium compound with a solvent; (3) fabricating an electrolyte precursor by mixing the branched macromolecules, the ion conductive electrolytic solution, and at least one initiator; (4) solidifying the electrolyte precursor by UV irradiation or heating.

A third aspect of the present invention is to provide a method for fabricating an amorphous composite solid electrolyte, forming a three-dimensional branched macromolecule, which includes (1) reacting polyether polyol with a diisocyanate selected from 1,4-diisocyanatobutane, hexamethylene diisocyanate, 1,4-phenylene diisocyanate, trans-1,4-cyclohexylene diisocyanate, or diphenylmethane 4,4'-diisocyanate to form a first mixture; (2) reacting the first mixture with one of 2-hydroxyethyl acrylate, 4-hydroxybutyl acrylate, 2-hydroxyethyl methacrylate, or N-hydroxyethyl acrylamide, where dibutyltin dilaurate is used as catalyst for the reaction (3) synthesizing at least one ion conductive electrolytic solution by mixing a lithium compound with a solvent; (4) fabricating an electrolyte precursor by mixing the branched macromolecules, the ion conductive electrolytic solution, and at least one initiator; (5) solidifying the electrolyte precursor by UV irradiation or heating.

In a first embodiment of the second aspect of the present invention, there is provided a method for fabricating an amorphous composite solid electrolyte where the mass ratio of the branched macromolecule to the ion conductive electrolytic solution is equal to or lower than 10 wt. %.

In a second embodiment of the second aspect of the present invention, there is provided a method for fabricating an amorphous composite solid electrolyte where the mass ratio of the branched macromolecule to the ion conductive electrolytic solution is approximately in a range from 3 to 15%.

In a third embodiment of the second aspect of the present invention, there is provided a method for fabricating an amorphous composite solid electrolyte where the formed branched macromolecule has a molecular weight in the range from 1,000 to 50,000.

In a fourth embodiment of the second aspect of the present invention, there is provided a method for fabricating an amorphous composite solid electrolyte further comprising including one or more additives selected from fluoroethylene carbonate, dimethyl glycol, orthoformate fluoride, tris (2,2,2-trifluoroethyl)orthoformate, 1,1,1,3,3,3-Hexafluoro-2-propanol, membrane-forming agents, fire retardants, or ceramic particles into the solid electrolyte fabricated by said method.

In a fifth embodiment of the second aspect of the present invention, there is provided a method for fabricating an amorphous composite solid electrolyte where the ion conductivity of the amorphous composite solid electrolyte is at least $1 \times 10^{-3}$ S/cm.

In a sixth embodiment of the second aspect of the present invention, there is provided a method for fabricating an amorphous composite solid electrolyte where the oxidation potential of branched macromolecule is at least 5V.

In a seventh embodiment of the second aspect of the present invention, there is provided a method for fabricating an amorphous composite solid electrolyte where the energy density of a secondary lithium-ion battery composed of the composite solid electrolyte is at least 300 Wh/kg.

BRIEF DESCRIPTION OF THE DRAWINGS

Embodiments of the present invention are described in more detail hereinafter with reference to the drawings.

FIG. 3A and FIG. 3B illustrate the optical image of the solid electrolyte before and after being stretched.

FIG. 4 shows DSC results of the branched macromolecule.

DEFINITION

Figure 1:
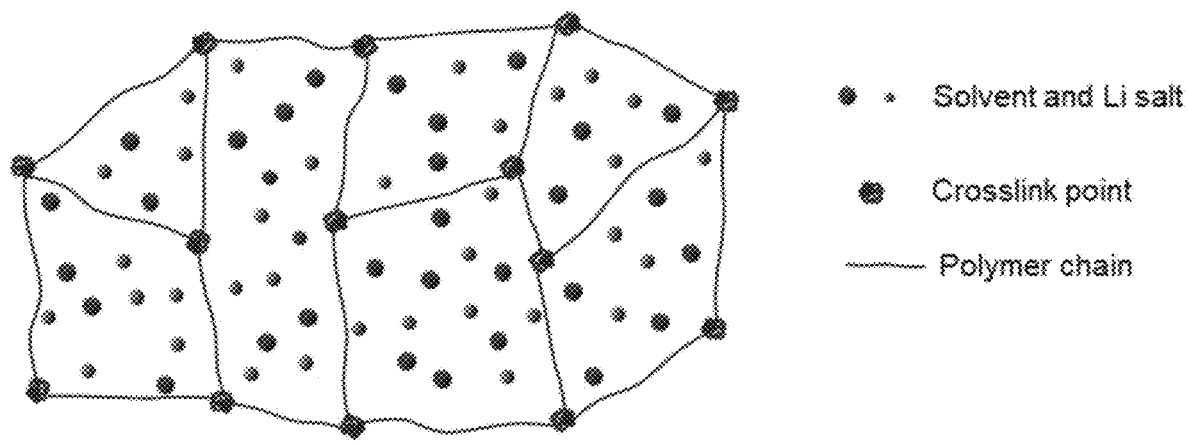
FIG. 1 illustrates the composite solid electrolyte.

References in the specification to "one embodiment", "an embodiment", "an example embodiment", etc., indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "a" or "an" are used to include one or more than one and the term "or" is used to refer to a nonexclusive "or" unless otherwise indicated. In addition, it is to be understood that the phraseology or terminology employed herein, and not otherwise defined, is for the purpose of description only and not of limitation. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

In the methods of preparation described herein, the steps can be carried out in any order without departing from the principles of the invention, except when a temporal or operational sequence is explicitly recited. Recitation in a claim to the effect that first a step is performed, and then several other steps are subsequently performed, shall be taken to mean that the first step is performed before any of the other steps, but the other steps can be performed in any suitable sequence, unless a sequence is further recited within the other steps. For example, claim elements that recite "Step A, Step B, Step C, Step D, and Step E" shall be construed to mean step A is carried out first, step E is carried out last, and steps B, C, and D can be carried out in any sequence between steps A and E, and that the sequence still falls within the literal scope of the claimed process. A given step or sub-set of steps can also be repeated. Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

DETAILED DESCRIPTION

The present invention provides an amorphous composite solid electrolyte and a preparation method thereof. The amorphous composite solid electrolyte comprises one or more three-dimensional branched macromolecules, an ion conductive electrolytic solution and the additives. Advantageously, the three-dimensional branched macromolecule is highly elastic enabling at least 500% swelling degree to the ion conductive electrolytic solution, and avoiding the leakage of the ion conductive electrolytic solution under stretching condition as well as maintaining contact with the electrodes. Meanwhile, the three-dimensional branched macromolecule is amorphous which facilitates the lithium ion transport in the ion conductive electrolytic solution.

FIG. 1 illustrates the amorphous composite solid electrolyte comprising one or more three-dimensional branched macromolecules, an ion conductive electrolytic solution and the additives. The three-dimensional branched macromolecules include a core portion and at least three arm portions forming a gel-like structure with a high swelling degree, which enables the high loading of an ion conductive electrolytic solution with lithium salts. The high loading of the ion conductive electrolytic solution results in the high ionic conductivity of the amorphous composite solid electrolyte. At the same time, the gel-like structure provides high elasticity, permitting the solid electrolyte to maintain the contact between the amorphous composite solid electrolyte and the anode to release the stress generated by the volume expansion/shrinkage of anode materials. For example, a lithium metal anode experiences a 400% volume change during the charging/discharging process, while a silicon-based anode experiences a 300% volume change during the charging/discharging process. Prior art solid electrolytes lack the elasticity to accommodate these extreme anode volume changes.

In addition, additives selected from fluoroethylene carbonate, dimethyl glycol, orthoformate fluoride, tris(2,2,2-trifluoroethyl)orthoformate, 1,1,1,3,3,3-Hexafluoro-2-propanol, membrane-forming agents, fire retardants, ceramic particles, or mixtures thereof may be included to enhance the properties of the amorphous composite solid. For example, ceramic particles further improve the mechanical properties of the amorphous composite solid electrolyte, avoiding short circuits.

Figure 2:
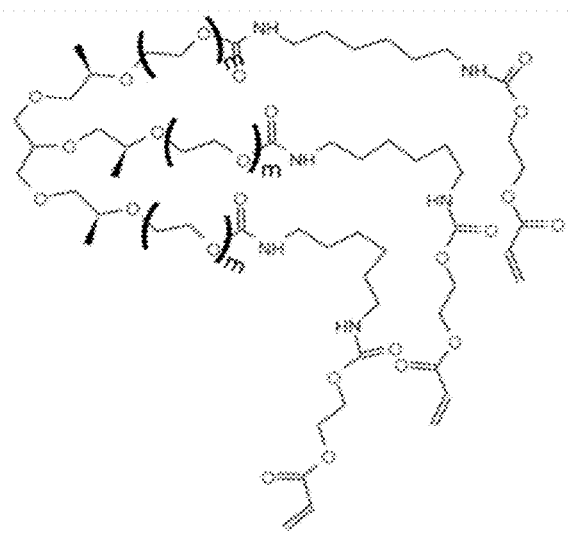
FIG. 2 shows an example of the branched macromolecule.

The three-dimensional branched macromolecule as shown in FIG. 2 includes a core portion and at least three arm portions; the molecular weight ranges from 1,000 to 50,000 Da. The core portion is selected from a polyol including ethylene glycol, glycerinum, pentaerythritol, xylitol, sorbitol and the like. The arm portion includes a random copolymer or a block polymer which comprises a first monomer and a second monomer. The first monomer may be ethylene oxide and the second monomer may be propylene oxide. The molar ratio of the first monomer to the second monomer is in the range from greater than 0 to less than or equal to 1. In addition to the first monomer and the second monomer, the arm portion further comprises a third monomer selected from acrylate, acrylamide, or epoxy. With the higher molecular weight and longer arm portions, the three-dimensional branched macromolecule forms a gel-like structure with high elasticity (FIGS. 3A and 3B) and at least 500% swelling degree to entrap larger amounts of the ion conductive electrolytic solution with lithium ion, leading to the higher ionic conductivity of the amorphous composite solid electrolyte.

Crystallization is a process of the alignment of the molecular chains that has great impact on the optical, mechanical, thermal or chemical properties of polymers or macromolecules. Materials with higher crystallinity yield solid electrolytes that resist the flow of the lithium ions, as ions may become trapped in the crystalline structures. To reduce the resistance to the flow of the lithium ions, the three-dimensional branched macromolecule in the present invention is amorphous. As seen in the heating/cooling curves of FIG. 4, no crystallization/melting peaks are present, indicating that the three-dimensional branched macromolecule is amorphous, facilitating the transport of lithium ions in the ion conductive electrolytic solution.

The amorphous composite solid electrolyte is prepared by the following: (1) synthesizing at least one three-dimensional branched macromolecule by reaction of a polyether polyol with one of 2-isocyanatoethyl acrylate or 2-isocyanatoethyl methacrylate, with dibutyltin dilaurate as a catalyst; (2) synthesizing at least one ion conductive electrolytic solution by mixing a lithium compound with a solvent; (3) fabricating an electrolyte precursor by mixing the branched macromolecules, the ion conductive electrolytic solution, and at least one initiator; (4) solidifying the electrolyte precursor by UV irradiation or heating, where the mass ratio of the branched macromolecule to the ion conductive electrolytic solution is approximately in a range from 3 to 15%.

The three-dimensional branched macromolecule can also be synthesized by using a two-step method: (1) reacting polyether polyol with a diisocyanate selected from 1,4-diisocyanatobutane, hexamethylene diisocyanate, 1,4-phenylene diisocyanate, trans-1,4-cyclohexylene diisocyanate, or diphenylmethane 4,4'-diisocyanate to form a first mixture; (2) reacting the first mixture with one of 2-hydroxyethyl acrylate, 4-hydroxybutyl acrylate, 2-hydroxyethyl methacrylate, or N-hydroxyethyl acrylamide, where dibutyltin dilaurate is used as catalyst for the reaction.

Examples

Figure 5:
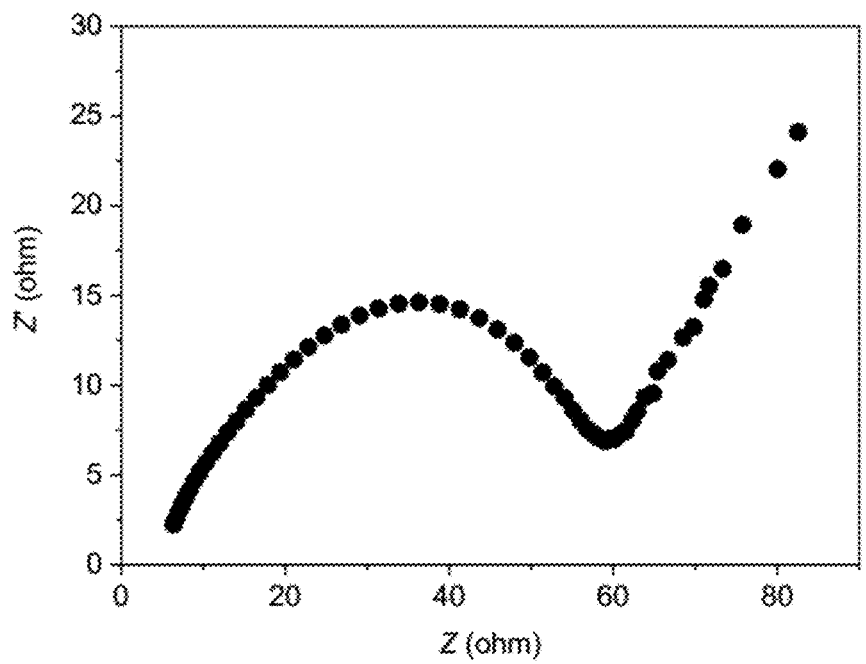
FIG. 5 illustrates the EIS curve of the solid electrolyte.

EIS (electrochemical impedance spectroscopy) has been performed to measure the ion conductivity of the amorphous composite solid electrolyte. The amorphous composite solid electrolyte with 10 wt % of the three-dimensional branched macromolecules and 90 wt % of commercial liquid electrolyte is sandwiched between two stainless steel plates for the EIS test. The thickness of the solid electrolyte is 95.1 μm with an area of 1.1 cm$^2$. The EIS test frequency range is $10^5$~1 Hz with an amplitude of 10 mV. The measured AC impedance of the solid electrolyte is 7.9 ohm (FIG. 5), thus the ionic conductivity ($\sigma$) of the solid electrolyte can be calculated as follows:

$$\sigma = \frac{95.1 \times 10^{-4} \text{ cm}}{7.9 \Omega \times 1.1 \text{ cm}^2} = 1.1 \times 10^{-3} \text{ S/cm}$$

Figure 6:
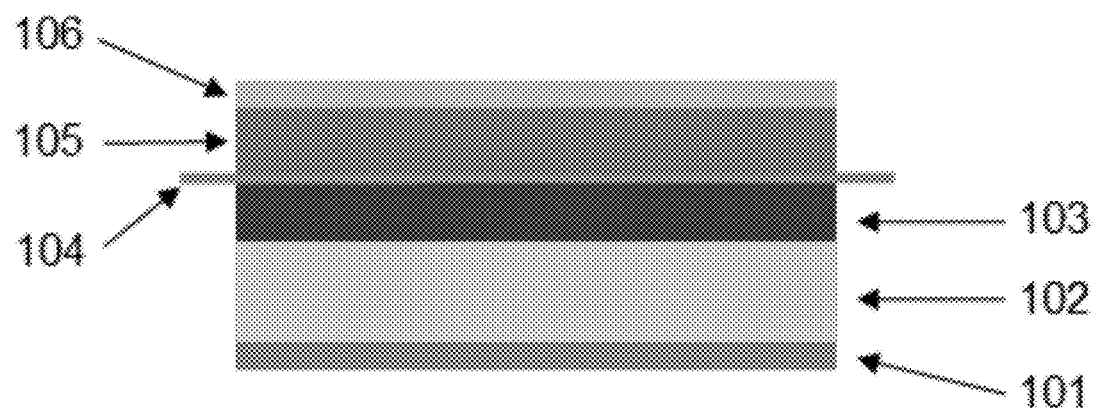
FIG. 6 shows an example of a coin cell.

An example of a coin cell with the amorphous composite solid electrolyte of the present invention is shown in FIG. 6. It includes a copper foil (101), Li metal foil (102), amorphous composite solid electrolyte (103), separator (104), cathode (105), and aluminum foil (106).

Figure 7:
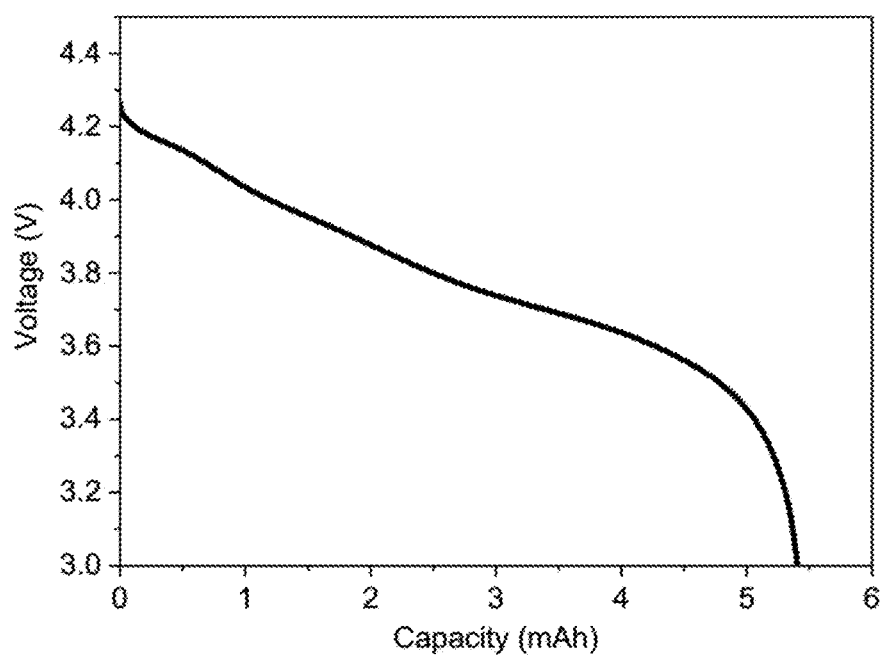
FIG. 7 illustrates the discharge curve of the coin cell.

FIG. 7 shows the discharge curve of a coin cell with 5 wt % of the three-dimensional branched macromolecules (formula of FIG. 2), and 95 wt % liquid electrolyte (1M LiPF$_6$ in EC (ethylene carbonate)/DMC (dimethyl carbonate)/DEC (diethyl carbonate)/FEC (fluoroethylene carbonate) with volume ratio of 4:4:4:3). From the discharge curve, the capacity of the coin cell can be obtained, which is 5.4 mAh. The cell shows a typical plateau characteristic of NCA (Nickel Cobalt Aluminum Oxide) at around 3.7 V. The mass of cathode (with Al foil as current collector) is 28.34 mg/cm$^2$; the mass of anode (with Cu as current collector) is 7.08 mg/cm$^2$; the mass of solid electrolyte is 24 mg. Therefore, the energy density of the cell can be calculated as:

$$\text{Energy density} = \frac{4.76 \text{ mAh/cm}^2 \times 3.7 \text{ V}}{25.56 \text{ mg} + 7.08 \text{ mg} + 21.2 \text{ mg}} = 329 \text{ wh/kg}$$

Figure 8:
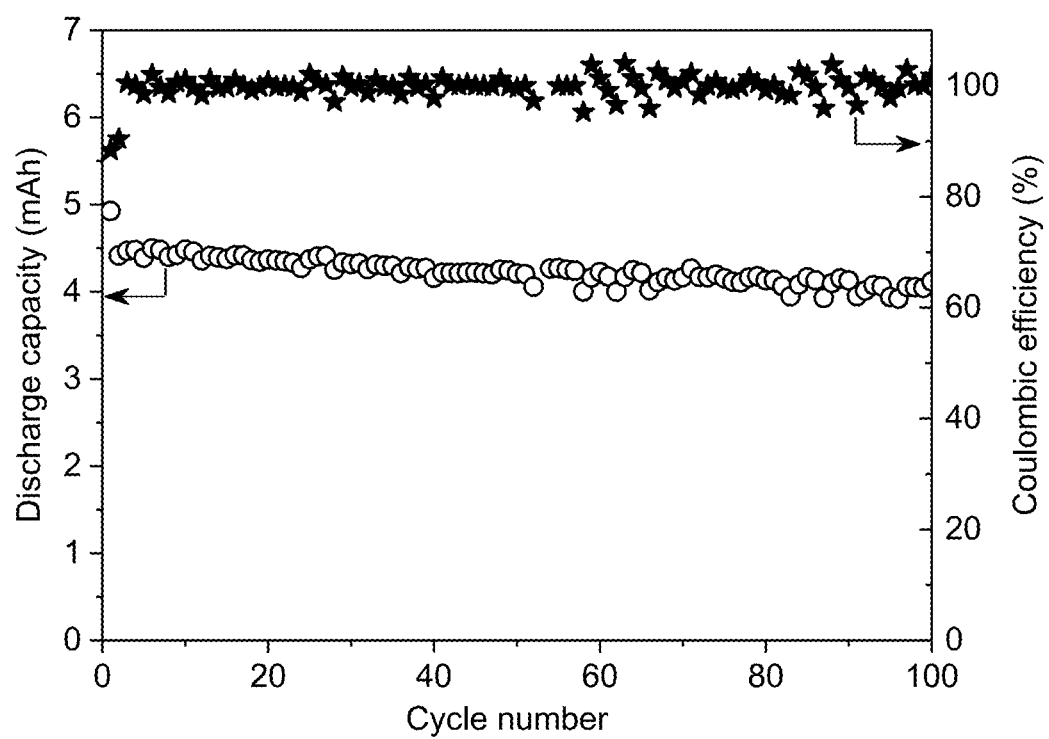
FIG. 8 shows the capacity and Coulombic efficiency of the coin cell.
Figure 9:
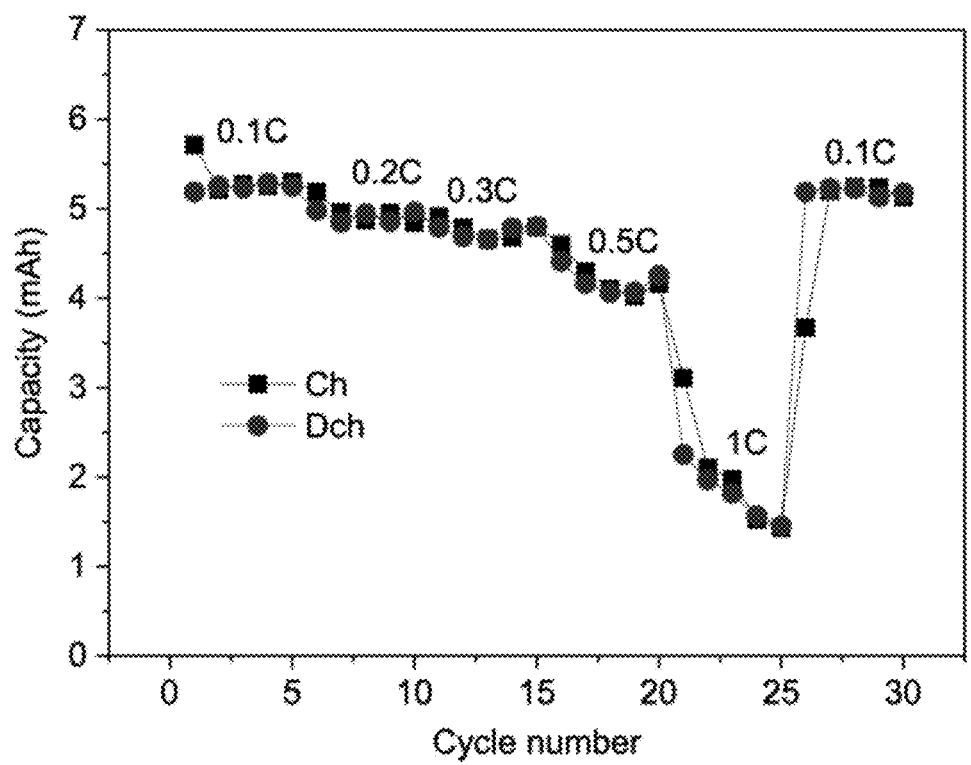
FIG. 9 illustrates the rate performance of the coin cell.

FIG. 8 shows the capacity and Coulombic efficiency of a coin cell with an NCA cathode and Li metal anode. The cell has a formation process of charging/discharging at 0.1 C for three cycles. The cell is charged/discharged at 0.2 C/0.5 C at room temperature, delivering a capacity of ~4.5 mAh. After 100 cycles, 93% of initial capacity is maintained. The Coulombic efficiency of the cell is maintained around 100%. In addition, the rate performance of a coin cell cycling using solid electrolyte with NCA cathode and Li metal anode is shown in FIG. 9. The cell can still be charged/discharged at 1 C.

Figure 10A:
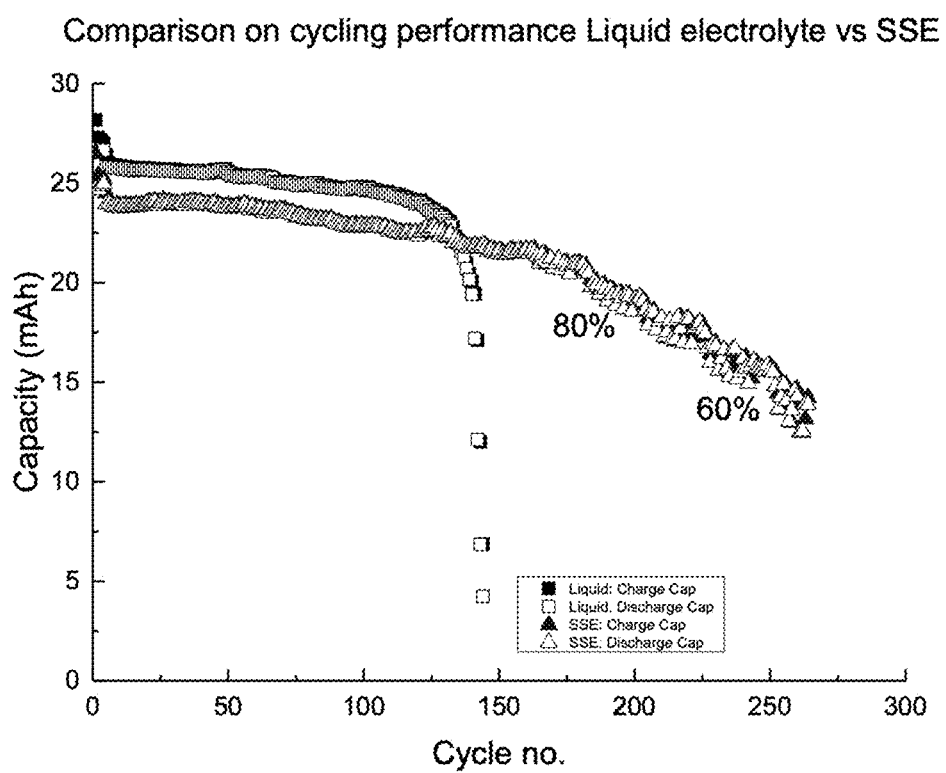
FIG. 10A illustrates the difference in cycling performance between liquid electrolyte and solid-state electrolyte (SSE) in a pouch.
Figure 10B:
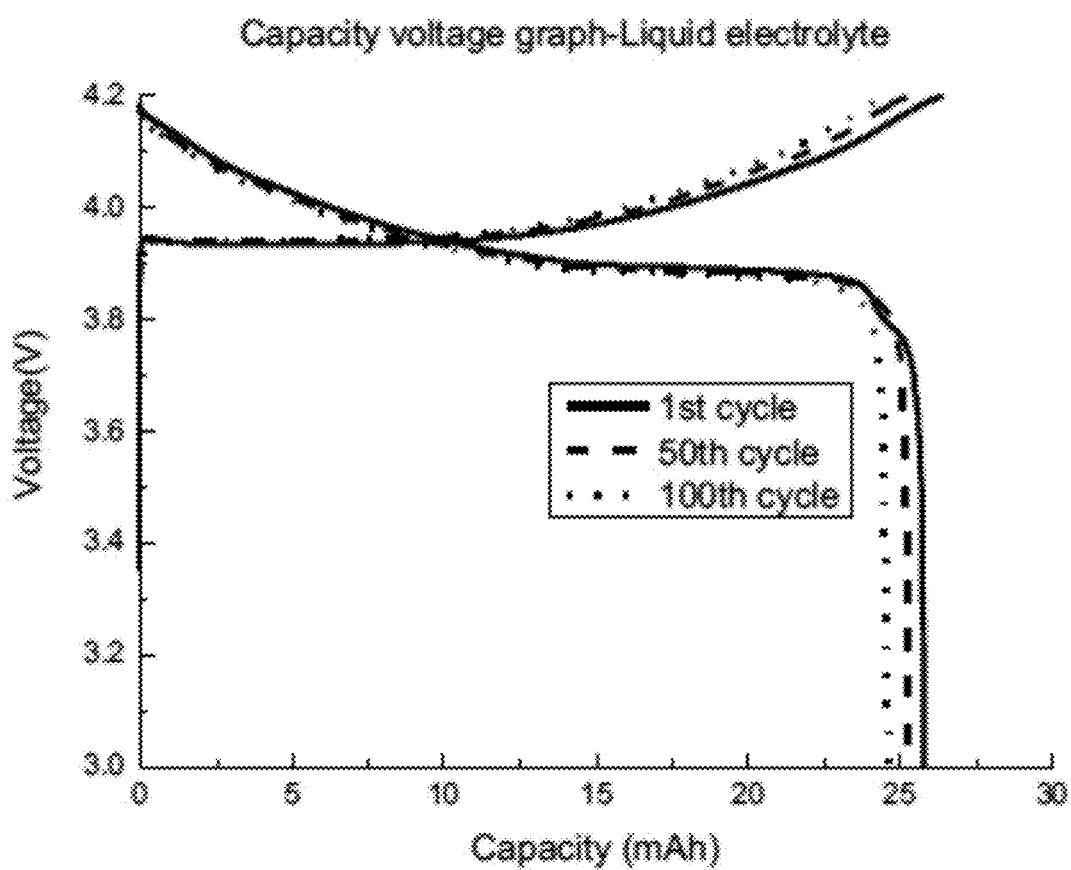
FIG. 10B illustrates a capacity-voltage relationship of liquid electrolyte in a pouch after 1, 50 and 100 cycles of charge/discharge.
Figure 10C:
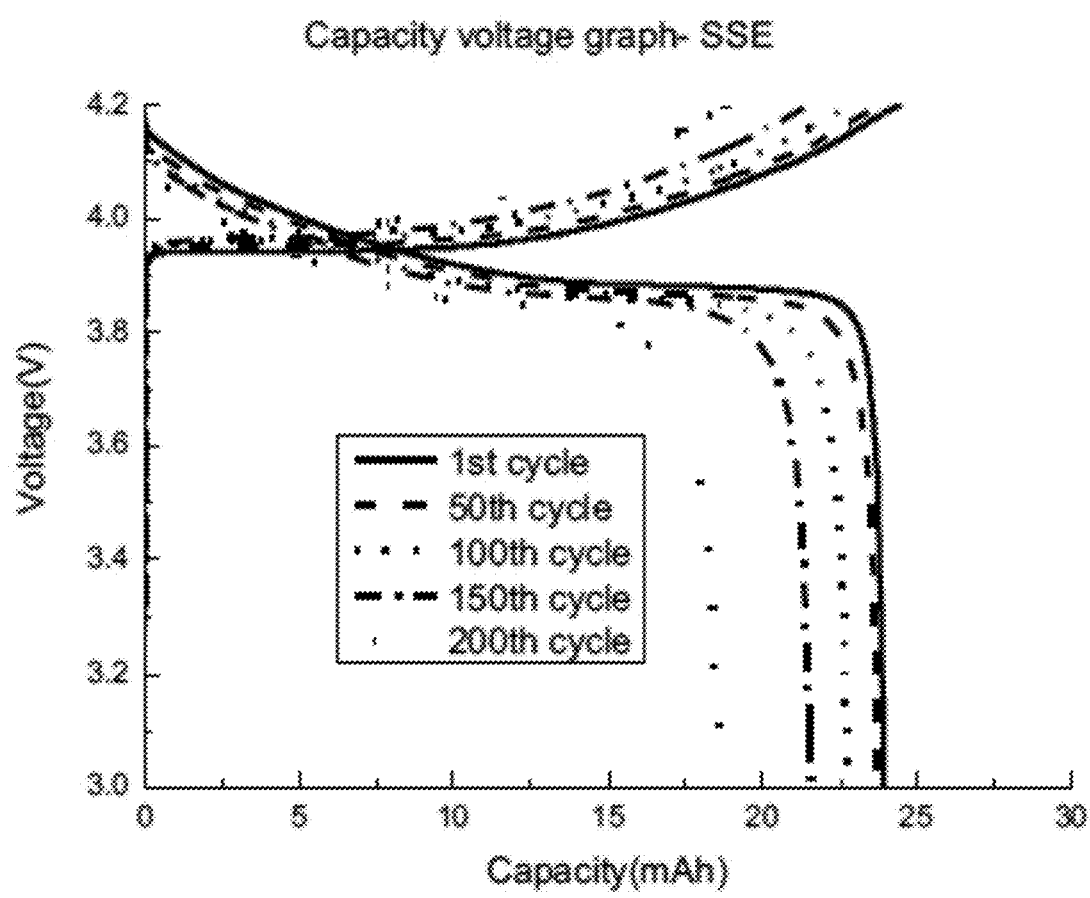
FIG. 10C illustrates a capacity-voltage relationship of SSE in a pouch after 1, 50, 100, 150 and 200 cycles of charge/discharge.

FIG. 10A shows the difference in cycling performance of a liquid electrolyte versus a solid-state electrolyte in a pouch. In this example, the UV cured composite solid electrolyte was used as the solid-state electrolyte material to compare with the liquid electrolyte to see the change in capacity after a significant number of charge/discharge cycles. As seen in FIG. 10A, the liquid electrolyte degraded more sharply at about 140-150 cycles of charge/discharge, whereas the solid-state electrolyte of the present invention degraded much more slowly and steadily even up to 250 cycles or more of charge/discharge. The results from FIG. 10A suggest that SSE in the pouch is more stable than liquid electrolyte in the pouch. FIG. 10B and FIG. 10C shows the change in voltage versus capacity over a different number of cycles of charge/discharge for the liquid electrolyte and SSE. The results suggest that the liquid electrolyte cannot withstand the applied voltage with the required capacity after about 100 cycles while the solid-state electrolyte can still withstand the applied voltage within the required capacity range after about 200 or more cycles of charge/discharge.

It will be appreciated by those skilled in the art, in view of these teachings, that alternative embodiments may be implemented without deviating from the spirit or scope of the invention, as set forth in the appended claims. This invention is to be limited only by the following claims, which include all such embodiments and modifications when viewed in conjunction with the above specification and accompanying drawings.

The invention claimed is:

1. An amorphous composite solid electrolyte comprising:
one or more three-dimensional branched macromolecules comprising a core portion and at least three arm portions connected to the core portion, each arm portion including a random copolymer or a block polymer comprising a first monomer and a second monomer with a molar ratio of the first monomer to the second monomer in the range from greater than 0 to less than or equal to 1; and the branched macromolecule is cross-linked to one or more additional three-dimensional branched macromolecules;
wherein the core portion is a polyol selected from ethylene glycol, glycerinum, pentaerythritol, xylitol, or sorbitol;
wherein the first monomer is ethylene oxide;
wherein the second monomer is propylene oxide; and
wherein each arm portion further comprises a third monomer selected from acrylate, acrylamide or epoxy;
an ion conductive electrolytic solution, wherein the ion conductive electrolytic solution comprises at least one lithium salt solution in an amount of 1 mol/l to 10 mol/l;
wherein the ion conductive electrolytic solution is entrained in the branched macromolecule, with a weight ratio of the branched macromolecule to the ion conducive electrolytic solution equal to or lower than 1:9, such that the branched macromolecule has a swelling degree of at least 5:1 (liquid:polymer in weight) of the ion conductive electrolytic solution;
wherein the branched macromolecule has a molecular weight in the range from 1,000 to 50,000; and
wherein the ion conductivity of the composite solid electrolyte is at least $1 \times 10^{-3}$ S/cm.

2. The amorphous composite solid electrolyte of claim 1, further comprising electrolyte additives selected from fluoroethylene carbonate, dimethyl glycol, orthoformate fluoride, tris(2,2,2-trifluoroethyl)orthoformate, 1,1,1,3,3,3-Hexafluoro-2-propanol, membrane-forming agents, fire retardants, ceramic particles, or mixtures thereof.

3. The amorphous composite solid electrolyte of claim 1, wherein the oxidation potential of the branched macromolecule is at least 5V.

4. A method for fabricating an amorphous composite solid electrolyte, forming a three-dimensional branched macromolecule is by a method comprising:
(i) reacting polyether polyol with a diisocyanate selected from 1,4-diisocyanatobutane, hexamethylene diisocyanate, 1,4-phenylene diisocyanate, trans-1,4-cyclohexylene diisocyanate, or diphenylmethane 4,4'-diisocyanate to form a first mixture;
wherein dibutyltin dilaurate is used as catalyst for the reaction;
wherein the three-dimensional branched macromolecules in the first mixture comprises a core portion and at least three arm portions connected to the core portion, each arm portion including a random copolymer or a block polymer comprising a first monomer and a second monomer with a molar ratio of the first monomer to the second monomer in the range from greater than 0 to less than or equal to 1; and the branched macromolecule is cross-linked to one or more additional three-dimensional branched macromolecules;
wherein the polyol is selected from ethylene glycol, glycerinum, pentaerythritol, xylitol, or sorbitol;
wherein the first monomer is ethylene oxide;
wherein the second monomer is propylene oxide; and
wherein each arm portion further comprises a third monomer selected from acrylate, acrylamide or epoxy;
wherein the branched macromolecule has a molecular weight in the range from 1,000 to 50,000;
(ii) synthesizing at least one ion conductive electrolytic solution by mixing a lithium compound with a solvent, wherein the lithium salt solution is in an amount of approximately 1 mol/l to 10 mol/l;
(iii) fabricating an electrolyte precursor by mixing the branched macromolecules, the ion conductive electrolytic solution, and at least one initiator; wherein the mass ratio of the branched macromolecule to the ion conductive electrolytic solution is equal to or lower than 10 wt. % and the branched macromolecule has a swelling degree of at least 5:1 (liquid:polymer in weight) of the ion conductive electrolytic solution;

(iv) solidifying the electrolyte precursor by UV irradiation or heating;

wherein the ion conductivity of the fabricated composite solid electrolyte is at least $1\times10^{-3}$ S/cm.

5. The method for fabricating the amorphous composite solid electrolyte of claim 4, further comprising including one or more additives selected from fluoroethylene carbonate, dimethyl glycol, orthoformate fluoride, tris(2,2,2-trifluoroethyl)orthoformate, 1,1,1,3,3,3-hexafluoro-2-propanol, membrane-forming agents, fire retardants, or ceramic particles into the solid electrolyte fabricated by said method.

6. The method for fabricating the amorphous composite solid electrolyte of claim 4, wherein the oxidation potential of branched macromolecule is at least 5V.

7. The method for fabricating the amorphous composite solid electrolyte of claim 4, wherein the energy density of a secondary lithium-ion battery composed of the composite solid electrolyte is at least 300 Wh/kg.

8. A secondary lithium-ion battery including a lithium metal anode and the amorphous composite solid electrolyte of claim 1, wherein the energy density of the battery is at least 300 Wh/kg.

\* \* \* \* \*